July 5, 1960
R. F. JOY ET AL
2,943,434
SPLICE AND METHOD OF MAKING THE SAME
Filed March 16, 1956
2 Sheets-Sheet 1
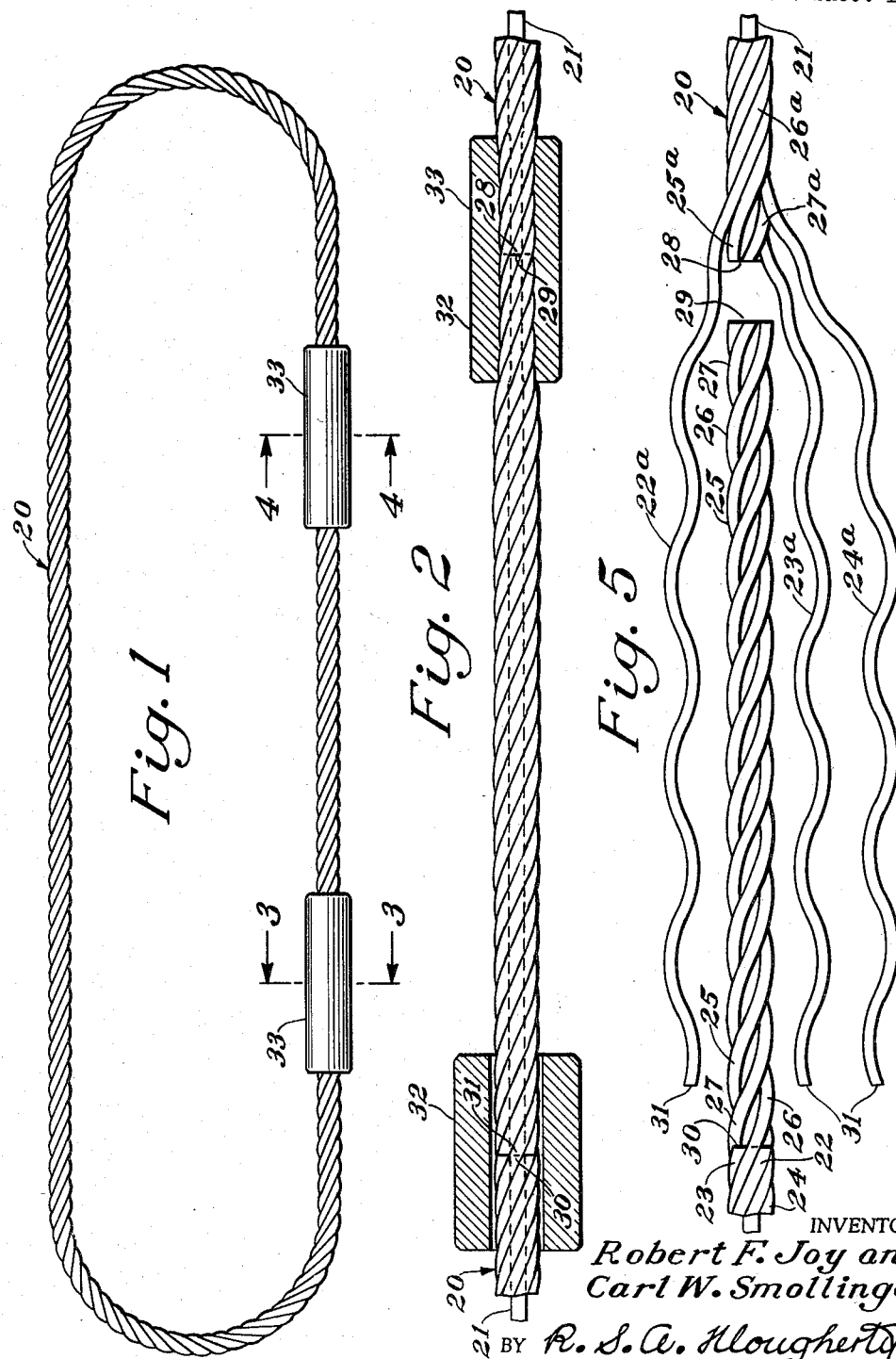
INVENTORS
Robert F. Joy and
Carl W. Smollinger
ATTORNEY

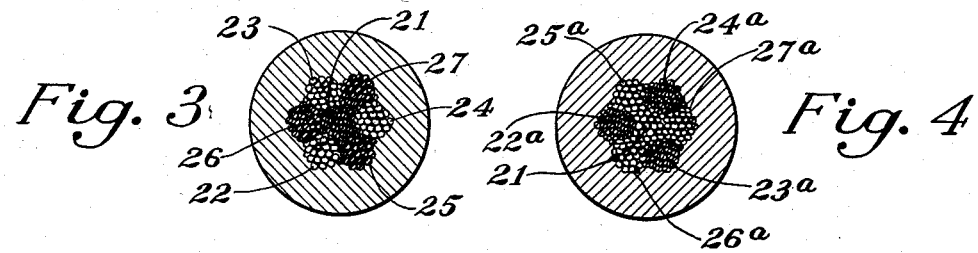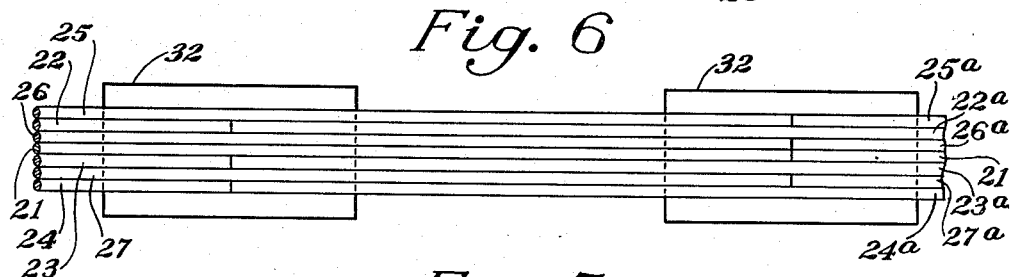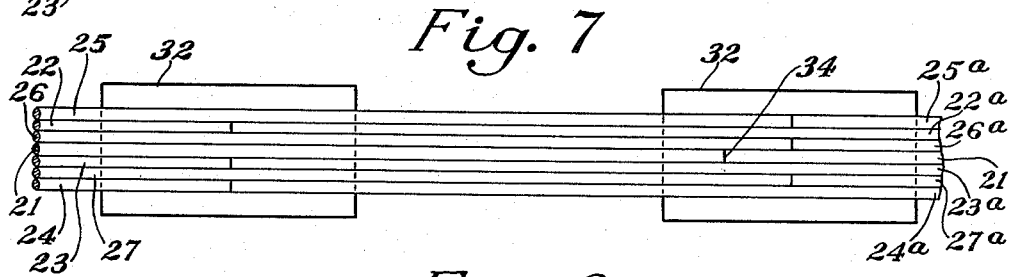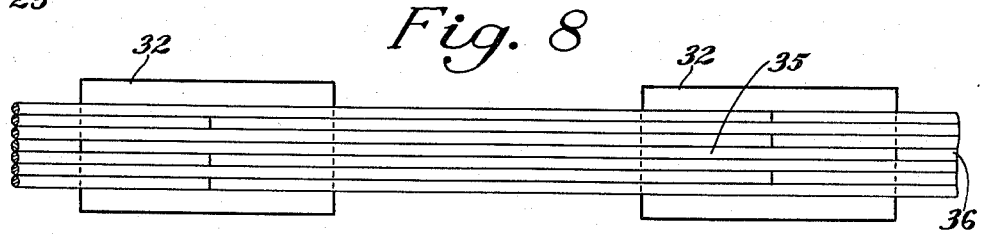

United States Patent Office 2,943,434
Patented July 5, 1960

2,943,434
SPLICE AND METHOD OF MAKING THE SAME

Robert F. Joy and Carl W. Smollinger, Bethlehem, Pa., assignors to Bethlehem Steel Company, a corporation of Pennsylvania Filed Mar. 16, 1956, Ser. No. 571,990

11 Claims. (Cl. 57—142)

This invention relates to a splice for a wire rope and to a method of making the same, particularly a splice for a continuous loop or grommet, such as is used for catapult slings in the launching of aircraft.

One object of this invention is to provide a splice which is easily and quickly made and yet which does not require a highly skilled artisan for its production.

Another object of this invention is to provide a splice which is easily formed without braiding or tucking and in which no strand ends can come to the rope's surface.

A further object of the invention is to provide a splice which will develop the full rated strength of the rope.

Having thus briefly described our invention we will now refer to the two drawings which form a part of this specification.

Fig. 1 is a view showing in elevation a completed sling.

Fig. 2 is a view cutting longitudinally through the sleeves, one of which is shown prior to and the other after compression.

Figs. 3 and 4 are cross sections through the sleeves at 3—3 and 4—4 respectively as indicated in Fig. 1.

In Fig. 5 the method of cutting away certain strands from opposite ends of the rope, preparatory to butting the remaining strands and placing the sleeves, is shown.

Figs. 6 and 7 diagrammatically show how the strands and core are cut when ropes having a metallic center core are used.

Figs. 8 and 9 diagrammatically show how the strands and core are cut, and the core replaced when a rope having a hemp or other non-metallic core is used.

In making the grommet shown in Figs. 1 through 6 inclusive, the following procedure is employed. A continuous length of wire rope 20, having an independent wire rope core, is formed into a loop with its ends overlapping approximately three lay lengths. At one end of the rope 20, which has six outer strands 22 to 27 inclusive and a core 21, alternate strands 22, 23 and 24 are unlaid and cut out for the length of the overlap as indicated at 30 leaving the strands 25, 26 and 27 and core 21 uncut with their ends indicated at 29. At the other end of the rope, alternate strands 25a, 26a and 27a are unlaid and cut out for length of the overlap. Core 21 is also cut out for the length of the overlap, the severed ends of strands 25a, 26a and 27a and core 21 being indicated at 28, and the ends of strands 22a, 23a and 24a being indicated at 31. The ends 28 and 29 are now brought to an abutting position and the strands 22a, 23a and 24a are laid into the spaces from which strands 22, 23 and 24 have been removed. Thus a continuous loop of rope is formed having two discontinuities one at the abutment of ends 30 and 31 in which there are three cut strands and the other at the abutment of ends 28 and 29 in which there are four cut ends, three strands plus the core. Tubular metal sleeves 32 which have previously been slipped over the rope ends are now brought into position over the discontinuities and there compressed upon the rope. This compression is accomplished preferably by means of progressive pressure of a die in small increments along the sleeve whereby the sleeve and rope are reduced in cross-sectional area and the sleeve is lengthened as at 33. It will be apparent that for 100% efficiency the sleeve shown at the right hand of Figs. 1 and 2 is only required to develop four-sevenths of the total rope strength, since three strands are continuous through the sleeve.

The amount of compression applied to the sleeve should be sufficient to prevent the rope ends from slipping under load but not sufficient to rupture the sleeve or cause damage to the individual wires of the rope.

Fig. 6 shows diagrammatically the splice shown in Figs. 2 and 5, with similar parts indicated by the same numbers.

Fig. 7 shows diagrammatically an alternative method of cutting the strands and core. In Fig. 6 all of the strands as well as the core are cut at points which come mid-way of the sleeve, that is all of the discontinuities fall at either of two locations. In Fig. 7 the strands are all cut as in Fig. 6 but the core may be cut at about the quarter point 34 in the sleeve length; the core thus provides a solid mandrel for the outer strand ends when the sleeve is compressed.

When ropes having a fiber core are used the core is removed and replaced by a metal wire, strand or rope in order that there will be a uniformly solid area within the sleeve to which pressure may be applied. Preferably the fiber core is replaced for the entire length between the sleeves as well as through the sleeves but it is satisfactory to replace the fiber with metal only within the sleeves, leaving a fiber core between the sleeves.

Fig. 8 shows diagrammatically a metal core 35 replacing a fiber core 36 within and between the sleeves 32 when a rope having a fiber core is being used.

Fig. 9 shows how a piece of metal core insert 37 of approximately the length of the sleeve may be used when a single sleeve 38 is used for a splice in a fiber core rope.

If desired, the core of a metal-cored rope may also be replaced by a metal insert as illustrated in Figs. 8 and 9.

This invention, although described in connection with the manufacture of grommets from a single rope, is also applicable to the splicing of two separate ropes.

It will be obvious to those skilled in the art that our invention is susceptible of various changes and modifications without departing from the spirit thereof and we desire, therefore, that only such limitations shall be placed thereupon as are imposed by the prior art or as are specifically set forth in the appended claims.

We claim:

1. A method of splicing two ends of wire rope having a metallic core which comprises severing alternate strands from each of said ends, and the core from one end, at a predetermined distance from the ends, butting the cores of said two ends, laying the unsevered strands of each end in the spaces formed by the removal of the strands of the other end, applying sleeves to the rope sling at the points where the strands abut, and compressing said sleeves about said strands.

2. Method of splicing two wire ropes having a metallic core which comprises establishing a splice length, severing alternate strands of the first rope at a distance from the end thereof equal to the splice length, severing alternate strands of the second rope at a distance from the end thereof equal to the splice length, removing the core from said ropes in a total amount equal to the splice length, laying said ropes together with their cores abutting and with the unsevered strands of each rope lying in the spaces left by the severed strands of the other rope, and compressing sleeves on said rope at the points at which said strands abut.

3. Method according to claim 2 in which the core ends abut within one of the sleeves at a point spaced from the point of abutment of the strand ends.

4. Method according to claim 2, in which the amount of core removed from one of said ropes is equal to substantially one-quarter the length of one sleeve.

5. Method of splicing together two fiber core wire ropes which comprises abutting the ends of the strands of said ropes, replacing the core of the rope adjacent the abutting ends with a metallic insert, applying a sleeve around the abutting ends of the strands of a length substantially equal to the length of said wire rope insert, and compressing said sleeve about said strands.

6. Method of splicing together two wire ropes which includes severing alternate strands of each of said ropes at a predetermined distance from the ends thereof, removing the core of each of said ropes for a distance equal to the distance at which said strands are severed plus at least one-half the length of a sleeve, replacing the core of the rope with a metallic insert, lying the unsevered strands of each rope in the spaces formed by the removal of the strands of the other rope, with the ends of the strands abutting, applying sleeves to the rope at the points at which the strands abut and compressing said sleeves about said strands.

7. Method of splicing two ropes together which comprises establishing a splice length, severing alternate strands of the first rope at a distance from the end thereof equal to the splice length, severing alternate strands of the second rope at a distance thereof equal to the splice length, removing the cores from said ropes in a total amount equal to the splice length plus approximately one-half the sleeve length, laying said ropes together with the unsevered strands of each rope lying in the spaces left by the severed strands of the other rope and with a metallic core laid in the space left by the severed cores, and compressing sleeves on the ropes at the points at which said strands abut.

8. A splice for two wire rope ends having metallic cores in which alternate strands of each of said ends are laid into voids from which corresponding strands of the opposite ends have been severed at a like distance from each rope end, sleeves pressed upon said rope at each of the two severance points thus forming an endless element having a rope body of the same cross sectional area throughout and in which all strand ends are confined within said sleeves.

9. A method of splicing together two wire rope ends comprising severing alternate strands of one of said rope ends at a predetermined distance from said end, severing alternate strands and the core of the other of said rope ends at the same predetermined distance from its end, laying the unsevered strands of each rope end in the valleys lying between the unsevered strands of the other rope end, with the ends of said unsevered strands abutting the ends of the severed strands, placing sleeves about said strands at said points of contact, providing a metallic core for said strands at said points of contact, and compressing the sleeves.

10. Method of splicing two wire ropes having a metallic core which comprises establishing a splice length, severing alternate strands of the first rope at a distance from the end thereof equal to the splice length, severing alternate strands of the second rope at a distance from the end thereof equal the splice length, removing the core from one of said ropes in an amount equal to the splice length, laying said ropes together with their cores abutting and with the unsevered strands of each rope lying in the spaces left by the severed strands of the other rope, and compressing sleeves on said rope at the points at which said strands abut.

11. Method of splicing together two fiber core wire ropes which comprises severing alternate strands of each of said ropes at a predetermined distance from the ends thereof, removing the core of each of said ropes for a distance equal to the distance at which said strands are severed plus approximately one half the length of a sleeve, replacing the core of the rope with a metallic insert, laying the unsevered strands of each rope in the spaces formed by the removal of the strands of the other rope, with the ends of the strands abutting, applying sleeves to the rope at the points at which the strands abut and compressing said sleeves about said strands.

References Cited in the file of this patent

UNITED STATES PATENTS

| Number | Name | Date |
|---|---|---|
| 345,719 | Nash | July 20, 1886 |
| 411,637 | Batchelor | Sept. 24, 1889 |
| 1,707,324 | Schlecker | Apr. 2, 1929 |
| 2,083,369 | Greene | June 8, 1937 |
| 2,482,204 | Peterson | Sept. 20, 1949 |
| 2,563,829 | Fitzgerald et al. | Aug. 14, 1951 |

FOREIGN PATENTS

| Number | Country | Date |
|---|---|---|
| 868,788 | Germany | Feb. 26, 1953 |

UNITED STATES PATENT OFFICE

CERTIFICATE OF CORRECTION

Patent No. 2,943,434            July 5, 1960

Robert F. Joy et al.

It is hereby certified that error appears in the printed specification of the above numbered patent requiring correction and that the said Letters Patent should read as corrected below.

Column 3, line 22, for "lying" read -- laying --.

Signed and sealed this 13th day of December 1960.

(SEAL)
Attest:

KARL H. AXLINE
Attesting Officer

ROBERT C. WATSON
Commissioner of Patents